United States Patent [19]
Kalnoki Kis et al.

[11] 3,901,732
[45] Aug. 26, 1975

[54] THIN FLAT CELL CONSTRUCTION HAVING A GAS-PERMEABLE COATED PERFORATED ANODE

[75] Inventors: Tibor Kalnoki Kis, Westlake; Thomas A. Reilly, Bay Village, both of Ohio

[73] Assignee: Union Carbide Corporation, New York, N.Y.

[22] Filed: July 18, 1974

[21] Appl. No.: 489,843

[52] U.S. Cl. .............................. 136/111; 136/177
[51] Int. Cl. ............................................ H01m 21/04
[58] Field of Search .......... 136/111, 108, 107, 177, 136/179, 163, 10, 175

[56] References Cited
UNITED STATES PATENTS

| | | | |
|---|---|---|---|
| 2,762,858 | 9/1956 | Wood | 136/111 X |
| 3,489,616 | 1/1970 | Fangradt et al. | 136/107 |
| 3,563,805 | 2/1971 | Deierhoi, Jr. | 136/111 |
| 3,607,430 | 9/1971 | Glover | 136/111 |
| 3,741,813 | 6/1973 | Bergum et al. | 136/107 |

*Primary Examiner*—Anthony Skapars
*Attorney, Agent, or Firm*—C. F. O'Brien

[57] ABSTRACT

A thin flat cell employing a perforated anode (zinc sheet), a cathode (manganese dioxide), an electrolyte (ammonium chloride) and a cathode collector (steel); said anode being coated with a gas-permeable electrolyte-impermeable polymeric material which allows the venting of undesirable gases formed within the cell while preventing any electrolyte loss from said cell.

24 Claims, 4 Drawing Figures

THIN FLAT CELL CONSTRUCTION HAVING A GAS-PERMEABLE COATED PERFORATED ANODE

FIELD OF THE INVENTION

This invention relates to an improved construction for thin flat cells or batteries and particularly to thin flat cells or batteries employing a gas-permeable coated vented anode.

DESCRIPTION OF THE PRIOR ART

The continuing development of portable electrically powered devices of compact design such as tape recorders and playback machines, radio transmitters and receivers, shavers, watches, and motion picture or still cameras creates a continuing demand for the development of reliable, compact batteries for their operation. The power needs of such devices are varied. Thus, a watch requires a battery which will perform uniformly for at least a year at low drain; recorders and radios require batteries which will operate intermittently for perhaps a half hour to several hours at substantially higher drains followed by longer periods of nonuse. A motion picture camera in which a battery may operate exposure control means as well as drive a motor usually requires the battery to operate in a repetitive series of relatively short periods of time in a given day, but may not be used for weeks or months. A still camera in which a battery may be used to fire a flash bulb and in some cases to control exposure means and advance the film after each exposure requires the battery to deliver a series of pulses of rather high current, frequently in rapid succession.

While the battery industry has been quite successful in providing batteries to satisfy these diverse demands, the vast majority of the batteries produced for and used in devices of the type discussed are cylindrical. They may range in height from the familiar "button" cells to as much as one-half inch to one inch or even more and in diameter from roughly about one-half inch to one inch or more. Although they are excellent sources of electricity, their shape has limited to some extent the size and shape of the devices for which they are intended. As design concepts change there is increasing emphasis placed on thin, flat shapes. Devices of thin, flat shape cannot be made to accommodate the familiar cylindrical battery without devoting more space to the battery than is desired. Accordingly, there is an increasing demand for thin, flat batteries.

The problem associated with maintaining good electrical contact between cell elements is particularly notable in thin flat cell constructions where external supports are generally impractical since such members may be many times the thickness of the cell itself. In addition, since such flat cells possess a large unsupported surface, the usual means employed for maintaining cell integrity along the periphery of the cell may not be sufficient to maintain good electrical contact between cell elements at the center of the flat cell because of the formation of gases within the cell which has a tendency to separate the cell components thereby increasing the resistance of the cell to a degree that the cell could become inoperative for its intended use.

It has previously been suggested in the prior flat cell art that adhesives be used in assembling specific cell components, for example, between cathode and cathode collector, between collector and the outer envelope, and between cells in a stack. These bonding techniques are set forth in detail in U.S. Pat. Nos. 2,870,235 to Soltis, 3,379,574 to Grulke, et al., 2,762,858 to Wood, 3,223,555 to Solomon, et al., 2,658,098 to Coleman et al., and 2,487,985 to Ruben. The adhesives described in these patents have been suitable for use only in a limited portion of the cell and could not be used to maintain the entire cell structure as an integral unit. For example, none of the adhesives previously suggested has been entirely suitable for use in providing permanent adhesion to the corroding face of the cell anode. In this connection, it is well known that during discharge of the cell, the anode metal is consumed, and if consumed in a nonuniform manner, physical voids could occur on and in the anode surface. Proper wetting of the anode surface by the adhesive must be maintained for the adhesive to be effective.

U.S. Pat. No. 3,563,805 to Deierhoi, Jr. discloses a flat cell having an anode, a cathode, a separator, an immobilized adhesive electrolyte and a cathode collector, all of which are appropriately arranged and adhesively secured together by a conventional sealing means which effectively maintains a relatively low electrical resistance contact between all the individual cell components.

In U.S. Pat. No. 3,617,387 to Grulke, et al., a flat cell is disclosed which has all its components completely internally bonded together with a polymeric adhesive, said adhesive maintaining physical and electrical contact between the components.

Another approach to produce a flat multicell battery is disclosed in U.S. Pat. Nos. 3,770,504 to Bergum, et al., and 3,770,505 to Bergum, wherein the confronting faces of each adjacent pair of conductive layers forming the battery are adhered and electrically bonded one to the other. In addition, adjacent cells of the battery are electrically connected one to the other by means of an electrolyte impervious intercell connector layer which extends beyond the electrodes of the cells so that the peripheral faces of the intercell connector layers can be suitably sealed to provide a liquid impervious seal around each cell.

Although all of the above approaches work to some degree in producing a flat cell, a buildup of undesirable gas pressure generally occurs within a cell during shelf storage or during discharging which could be sufficient to separate two or more of the cell's components thereby greatly increasing the internal resistance of the cell to a point where the cell becomes ineffective for its intended use.

Copending patent application Ser. No. 489,731 filed July 18, 1974, by T. Kalnoki-Kis, discloses another approach to producing a thin, flat cell or battery wherein the cathode collector of the cell is perforated for the purpose of venting undesirable gases formed during storage and discharge of the cell or battery.

It is an object of the present invention to provide a thin, flat cell or battery having novel means for venting undesirable gas formed within the cell so as to effectively minimize any gas pressure buildup within the cell.

Another object of the present invention is to provide a thin, flat cell or battery having a perforated anode which is coated on one side with a gas-permeable, electrolyte-impermeable adhesive or paint.

Another object of the present invention is to provide a thin, flat cell or battery having good ionic and/or electronic conductivity at the interfaces of each of the cell's components throughout storage and discharge of the cell.

Another object of the present invention is to provide a thin, flat cell or battery having a perforated anode and a perforated cathode collector, the former of which is coated on one of its sides while the latter is coated on at least one of its sides with a gas-permeable, electrolyte-impermeable paint or adhesive.

SUMMARY OF THE INVENTION

The invention relates to a thin, flat cell having a metal anode, a cathode of depolarizer mix, an electrolyte-permeable separator between said anode and said cathode, an electrolyte in contact with said anode and said cathode, and a cathode collector; said anode having a plurality of openings for venting undesirable gases formed in the cell and having on one of its surfaces a substantially continuous layer of a gas-permeable, electrolyte-impermeable paint; and wherein said cathode, said separator, and said electrolyte are bounded by a peripheral frame of electrolyte-impervious sealing material, said frame being bonded to at least a portion of the inner marginal faces of the anode and the cathode collector which extends beyond the area defined by said cathode, said separator and said electrolyte.

The invention also relates to a thin, flat cell having a metal anode; a cathode of depolarizer mix; an electrolyte-permeable separator between said anode and said cathode; and electrolyte in contact with said anode and said cathode; and a cathode collector; said anode having a plurality of openings for venting undesirable gases in the cell and having on one of its surfaces a substantially continuous layer of a gas-permeable, electrolyte-impermeable paint; and wherein all of said components of said cell are substantially adhesively secured together so as to maintain a relatively low electrical resistance contact between said individual cell components. The invention also relates to either of the above thin flat cell constructions wherein the cathode collector is perforated so as to contain a plurality of openings for venting undesirable gases formed in the cell and wherein said cathode collector has on at least one of its surfaces a substantially continuous layer of a gas-permeable, electrolyte-impermeable conductive paint.

As used herein, a substantially continuous layer shall mean at least a layer that effectively covers the openings on the surface of the anode, and when applicable, the cathode collector. In addition, when the material of the anode, and when applicable, the cathode collector, is such that it would be subject to excessive corrosion in a cell environment, then at least the surface of the anode and the cathode collector subject to such corrosion will be substantially covered with the layer.

The paint for use in this invention has to be a gas-permeable, electrolyte-impermeable adhesive paint, as for example, disclosed in U.S. Pat. Nos. 2,759,038; 2,745,774; 2,834,826; 3,072,558; 3,353,999; 3,343,995; 3,510,448; 3,563,851; 3,547,771 and 3,575,905. An additional paint or adhesive for use in this invention could comprise a solution of a copolymer of vinyl chloride and vinyl acetate in an organic solvent containing a suitable stabilizer for high temperature conditions and a plasticizer for flexibility.

In one embodiment of this invention, the cell's separator, electrolyte and cathode of depolarizer mix are bounded at one end by a metal anode and at the other end by a metallic cathode collector, said anode and cathode collector extending beyond the area defined by the cathode, separator and electrolyte thereby forming a peripheral recess between the marginal inner faces of said anode and said cathode collector into which a frame of electrolyte impervious sealing material is deposited. In this type cell construction, any gases formed during storage or during discharge of the cell will have a tendency to separate the components of the cell, i.e., the cathode collector from the cathode, or the separator from the anode, which will have the effect of increasing the internal resistance of the cell to a degree that the cell may become inoperative for its intended use. According to this invention, a plurality of openings are placed in the anode, and in some applications a plurality of openings are placed in the cathode collector also, for venting any undesirable gases formed within the cell. In addition to perforating the anode and when applicable, the cathode collector, a gas-permeable, electrolyte-impermeable paint is deposited on one surface of the anode and a gas-permeable, electrolyte-impermeable conductive paint is deposited on at least one surface of the cathode collector so as to prevent the loss of any electrolyte through the openings in the anode and cathode collector while simultaneously allowing for the escape of undesirable gases. By having the combination of a perforated anode, or a perforated anode and a perforated cathode collector, and a coating of a gas-permeable, electrolyte-impermeable paint on one or both cell components, respectively, the bonding strength provided by the peripheral frame of electrolyte impervious sealing material will be sufficient to maintain the physical and electrical contact between adjacent cell components during cell storage and discharge since any gases formed within the cell will be able to escape through the openings in one or both of the cell perforated components, respectively. Thus according to this invention, all components of the cell are secured in intimate contact, and no external pressure-exerting means need be employed. The frame of sealing material surrounding the cathode, separator and electrolyte, aids to rigidify the cell and in maintaining low electrical resistance contacts between the cell components in cooperation with the metal anode and the cathode collector to which the frame of sealing material is marginally sealed.

The size of the opening in the anode or the anode and cathode collector can vary between about 10 microns in diameter and about 250 microns in diameter, preferably between about 75 microns in diameter and about 175 microns in diameter. Openings larger than 250 microns in diameter will be unsuitable because of the tendency of the gas-permeable, electrolyte-impermeable conducting adhesive to shrink and crack on drying, thereby providing openings through which the electrolyte can escape. When using a conductive paint, openings smaller than 10 microns in diameter will be unsuitable because the particles of the conductive material may be sufficiently large enough to plug or substantially plug the openings thereby preventing the effective venting of the gases formed within the cell. In addition, it would be difficult using conventional perforating means to form openings smaller than about 10 microns.

The opening instead of being circular can be square, rectangular or any shape as long as the size of the opening is between about 78 square microns and about 65,000 square microns (~0.0006 cm$^2$), preferably between about 4,200 square microns (~0.00004 cm$^2$) and about 25,000 square microns (~0.00025 cm$^2$). In some instances, it may be feasible and advantageous to impart slits in the anode and/or cathode collector with any sharp instrument, such slits being at least about 0.0025 centimeter, preferably about 0.0075 centimeter, in width and up to about 1.0 centimeter in length.

The number of openings in the anode can vary depending on such features as the cell system. However, a minimum of at least one opening for every eight square centimeters of the anode is necessary if the gases formed within the cell are to escape without disrupting the contact between the cell components. The maximum number of openings in the anode would be limited to the number whereby the amount of anode material removed by providing openings would effectively decrease the amount of anode material needed for a proper electrochemical reaction within the cell. For the case of the cathode collector, a minimum of at least one opening every three square centimeters of cathode collector is necessary while the maximum number of openings in the cathode collector would be limited to the number whereby the cathode collector would effectively lose its conductive characteristics and/or integrity and strength required to maintain the cell as a structural power unit. Preferably the openings should be uniformly disposed throughout the cell's component and, where not uniformly disposed, the openings should be disposed at or near the center of the cell's component where mechanical support is at a minimum.

It is apparent that if a rather dense, low porosity cathode mix is used in the cell, then the number of openings in the cathode collector would have to be rather large to insure that any gas reaching the interface of the cathode mix and coated cathode collector would have an opening available through which the gas could escape. On the other hand, when a rather porous cathode mix is employed, then the number of openings required would not be great since any gas reaching the interface of the cathode mix and the coated cathode collector could easily circulate to a nearby opening and escape therefrom.

When employing a perforated cathode collector and a rather dense cathode mix, then the mix may be scored, perforated or suitably divided so as to provide adequate gas channels or passages within the mix leading to the interface of the cathode mix and the coated cathode collector.

Another embodiment of this invention would be similar to the above-described cell construction except that the anode and cathode collector would not extend beyond, but would be coextensive with, the area defined by the separator, electrolyte and cathode mix. In addition, all the cell components would be adhesively secured together as disclosed, for example, in U.S. Pat. Nos. 3,563,805 and 3,617,387. The additional requirement that the adhesive means employed to secure the cell components together be gas-permeable is necessary so as to allow any gas formed within the cell to circulate to the openings in the anode and, when applicable, the cathode collector. In this embodiment, all of the components of the cell are substantially adhesively secured in intimate contact so that no external pressure-exerting means is necessary.

Another embodiment of this invention would be a multicell battery comprising an outer negative (anode) electrode having a plurality of openings for venting gases formed within the battery and having on its outer surface a layer of a gas-permeable electrolyte-impermeable paint; an outer positive (cathode) electrode; at least one duplex electrode between the outer positive electrode and the outer negative electrode; a separator and an electrolyte between each positive and negative electrode; and a cathode collector with or without a plurality of openings for venting undesirable gases formed within the battery and, at least for the former, having on at least one of its surfaces a substantially continuous layer of a gas-permeable, electrolyte-impermeable conductive paint; said duplex electrode comprising a positive electrode bonded to a porous negative electrode via an electronically conductive layer of a gas-permeable, electrolyte-impermeable adhesive; and wherein all of said components of said battery are substantially secured together so as to maintain a relatively low electrical resistance contact between said individual cell components.

The positive electrode, electrolyte and separator of each cell could be bounded by a peripheral frame of electrolyte-impervious sealing material which could also be marginally bonded to each negative electrode and the adjacent conductive layer of the duplex electrode or the cathode collector whichever defines each such cell. Or, if desired, all of the components of the battery could be substantially adhesively secured together as disclosed in U.S. Pat. Nos. 3,563,805 and 3,617,387. If the latter construction is employed, then all the adhesive layers would have to be gas-permeable so as to permit any gases formed within the cell to circulate to the anode and when applicable, the cathode collector, where the gases could be vented.

In the multicell embodiment of this invention, it is preferable to have the cathode collector perforated in addition to the anode so as to provide maximum openings for venting any gases formed within the cell. When a perforated cathode collector is employed in a multicell embodiment having one duplex electrode, then it may not be necessary to have a porous negative electrode in the duplex electrode since any gas forming within the battery can be vented at the anode at one end and the cathode collector at the other end. When a porous negative electrode is employed, said porous negative electrode could be perforated in the same manner as the outer negative electrode of the multicell battery.

There are many conductive adhesives or paints which have been used, or are suitable for use, in the battery industry for bonding cell components together or for providing a cell component with a conductive layer. Examples of adhesives or paints, conductive or nonconductive, are set forth, as for example, in U.S. Pat. Nos. 2,745,744; 2,759,038; 2,834,826; 3,072,558; 3,353,999; 3,343,995; 3,510,448; 3,563,851; 3,547,771 and 3,575,905.

Plasticizers, including those materials which function as both a plasticizer and as a stabilizer, could be added in a minor amount to a conductive adhesive or paint to obtain specific chemical and mechanical properties desirable for a particular application. For example, stabilizers are generally added to maintain chemical stability at high temperatures and in oxidizing environments. Plasticizers are generally added to impart viscoelastic properties to the formed film. In many cases, a single material will function both as a stabilizer and as a plasticizer when added to an adhesive or paint.

To render an adhesive or paint conductive, some electrically conductive particulate material, such as acetylene black, graphite or mixtures thereof, should be added. Preferably, a mixture having a ratio of 1 part by weight acetylene black to 3 parts by weight graphite would be suitable for use on perforated cathode collectors of this invention. The conductive material shall not be added to the paint when the paint is used to coat a perforated metal anode, such as a zinc anode, since it would provide a direct short with the metal anode in the presence of the cell's electrolyte. However, in a duplex electrode construction for a multicell battery, the negative electrode would have to be coated with a conductive paint to insure electronic contact to the cathode of the duplex electrode. In the preferred embodiment of a multicell battery, the negative electrode of the duplex electrode would be a porous negative electrode.

Figure 1:
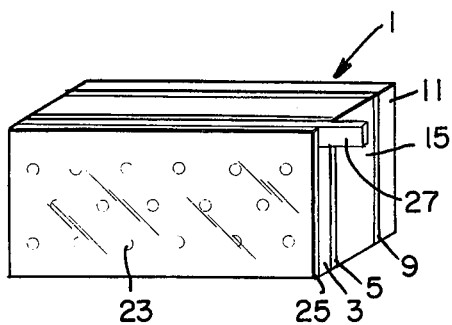
FIG. 1 is an isometric view of a cell made in accordance to this invention.
Figure 2:
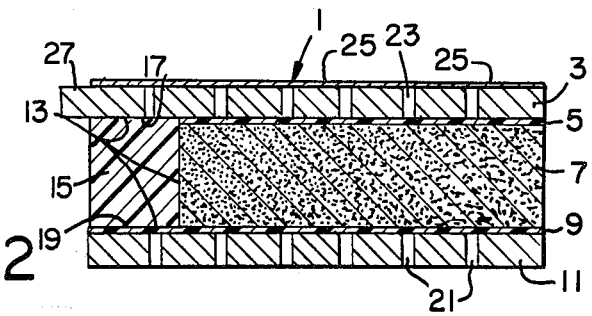
FIG. 2 illustrates a partial cross-section of a cell wherein the components of the cell are shown greatly magnified for purposes of illustration.

Referring in more detail to the drawings, there is shown in FIGS. 1 and 2 a thin, flat cell 1 having a vented anode 3, electrolyte-impregnated separator 5, cathode 7, conductive layer 9 and vented cathode collector 11. Electrolyte-impregnated separator 5 and cathode 7 are contained within and bound by anode 3 and cathode collector 11 forming a peripheral recess 13 which is filled with a frame of sealing material which marginally bounds cathode 7 and is secured to the inner marginal face 17 of anode 3 and the inner marginal face 19 of cathode collector 11 via the conductive layer 9. The adhesive used to form the frame must not react with the cell components or reaction products, should be electrolyte-proof and impermeable to water and vapor transfer and should retain these properties and its adhesivity over the range of cell temperature operations. Suitable adhesives which can be used as the sealing material include the conventional vinyl adhesives or hot melt adhesives of vinyl-wax mixtures.

Anode 3 is shown as having opening 23 for venting any undesirable gases formed within the cell during stroage or discharge. A tab 27 provides external electrical contact to the anode 3, said tab could be an integral part of the anode or a discrete, conductive member secured to the anode by conventional means. A gas-permeable coating 25 is applied to the top surface of anode 3 so as to enable gases to be vented through openings 23 while blocking the escape of any electrolyte from the cell.

Cathode collector 11 is shown as having openings 21 (optional) for venting any undesirable gases formed within the cell during storage or discharge. The composition of conductive layer 9 is as described above and is characterized as being conductive, gas-permeable and electrolyte-impermeable. Thus any gases formed within the cell can be vented at anode 3 through openings 23 or through openings 21 in cathode collector 11. Since most gas is formed at the vicinity of the anode, the openings in the anode will vent most of the gas formed within the cell. In some applications, the perforated anode will be sufficient to vent the gases formed within the cell and thus the cathode collector could be a solid plate as is conventional in the art.

To provide a battery of cells, it is necessary merely to place the anode of one cell in intimate electronic contact with the cathode collector of another thus effecting a series connection.

Generally, the surface contact pressure between the anode and the cathode collector of two adjacent superimposed cells required to provide good electronic contact therebetween will be insufficient to block venting from the cathode collector. However, if desired, additional horizontal venting passages may be disposed between said components of the adjacent cells.

Figure 3:
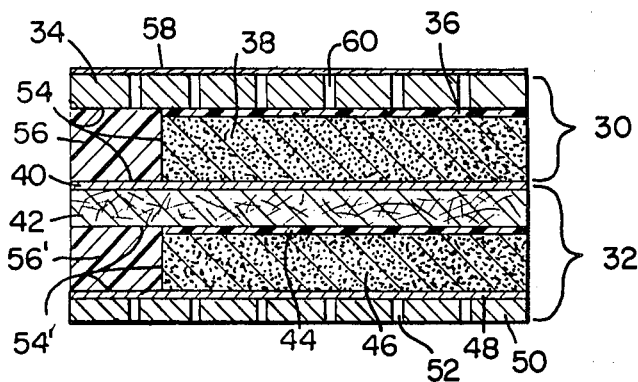
FIG. 3 illustrates a partial cross-section of a battery wherein the components of the cell are shown greatly magnified.

An alternate construction for a series stack battery is one having a "duplex" electrode in which one surface of a metal anode is provided with a conductive coating according to this invention and as shown in FIG. 3.

As seen in FIG. 3, two cells are arranged one above the other and adhesively secured together. The upper cell 30 comprises vented anode 34 having openings 60, electrolyte-impregnated separator 36 and cathode 38. A gas-permeable coating 58 is applied to the top surface of anode 34 so as to enable gases formed within the battery to be vented through openings 60 while blocking the escape of any electrolyte from the battery. When the anode 34 is zinc, a non-conductive adhesive or paint coating composition is employed, A conductive layer 40, as described above for layer 9 in FIG. 2. is then disposed between, and bonded to, porous anode 42 and cathode 38. The lower cell 32 comprises a porous anode 42, electrolyte-impregnated separator 44, and cathode 46. Disposed between and bonded to cathode 46 and cathode collector 50 is conductive layer 48 which is identical to the conductive layer 9 of FIG. 2. The peripheral recesses 54 and 54' are filled with a sealing material 56 and 56', respectively, as described in conjunction with FIG. 2. Cathode collector 50 is shown as having openings 52 for venting gases formed within the cell during storage and discharge. If desired, although not shown, anode 42 may be fabricated with openings similar to those shown for anode 34. For this type battery construction, layers 40, 48 and 58 should be gas-permeable so as to permit the gases within the cell to circulate to the openings 60 in the anode, and when applicable, to openings 52 in the cathode collector 50. Although not shown, an anode tab, as described above in conjunction with FIGS. 1 and 2, can be used as a terminal for providing external electrical contact to the anode.

Figure 4:
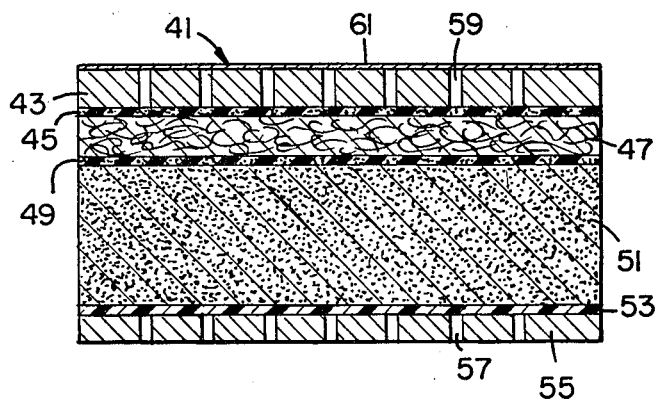
FIG. 4 is a cross-section of another embodiment of a cell wherein the components of the cell are shown greatly magnified.

FIG. 4 shows another embodiment of a cell of this invention wherein all of the cell components are substantially adhesively secured together as disclosed, for example, in U.S. Pat. Nos. 3,563,805 and 3,617,387. Specifically, cell 41 comprises a vented anode 43, having openings 59 and a top coated layer 61 as described above, a first layer 45 of immobilized electrolyte, an electrolyte-absorbent separator 47, a second layer 49 of immobilized electrolyte, cathode 51, a conductive layer 53 and cathode collector 55 having openings 57. The layers 45 and 49 of immobilized electrolyte provide the electrolyte which is in ionic or electrolytic contact with the anode and cathode of the cell. The electrolyte in this embodiment can be a viscous, tacky or "sticky" mass which can be held within the bounds of the cell by having a suitable electrolyte-impermeable coating placed around the sides of the cell. This mass, in addition to providing the electrolyte of the cell, will serve to hold the cell components together.

The preferred embodiment of this invention would employ the LeClance electrochemical system comprising manganese dioxide positive active material, zinc negative active material, preferably sheet zinc, and an electrolyte comprising ammonium chloride and/or zinc chloride. The cathode collector could be any conductive material such as steel, copper, zinc, nickel and nickel alloys, Grafoil* and the like, preferably steel because of its relatively low cost and good physical properties, such as strength.

*Grafoil is a trademark for flexible graphite material of expanded graphite particles compressed together. Grafoil is manufactured by Union Carbide Corporation, New York, N.Y. and is the subject matter of U.S. Pat. No. 3,404,061.

The perforated anode and/or perforated cathode collector of this invention, i.e., anode and/or cathode collector having a plurality of openings, could be porous conductive substrates having pores within the range of the openings specified above. Examples of such materials are compressed metal wools, sintered metals and the like.

Although the preferred electrochemical system is LeClanche, there are a wide variety of electrochemical systems that can be used in this invention. Among the positive electrode materials that are suitable for use in this invention are such materials as manganese dioxide, lead dioxide, nickel oxyhydroxide, mercuric oxide, silver oxide, inorganic metal halides such as silver chloride and lead chloride, and organic materials which are capable of being reduced such as dinitrobenzene and azodicarbonamide compounds. Among the negative electrode materials that are suitable for use in this invention are zinc, zinc-clad steel, aluminum, lead, cadmium and iron. Suitable electrolytes are ammonium chloride and/or zinc chloride, various alkaline electrolytes such as the hydroxides of potassium, sodium and/or lithium, acidic electrolytes such as sulfuric or phosphoric acid, and non-aqueous electrolytes, said electrolytes being chosen to be compatible with the negative and positive electrodes. The electrolytes may be either gelled or liquid depending on the particular cell construction and the electrochemical system used. The separator may be made from a wide variety of materials including the fibrous and cellulosic materials which are conventional in battery construction as well as from woven or non-woven fibrous materials such as polyester, nylon, polyethylene and glass.

Preferred electrochemical systems for use in this invention are those in which the positive electrode comprises manganese dioxide, the negative electrode comprises metals such as zinc, zinc-clad steel or aluminum, and the electrolyte substantially comprises an acidic solution of inorganic salts. Another preferred electrochemical system is the alkaline manganese system in which the positive electrode comprises manganese dioxide, the negative electrode comprises zinc, and the electrolyte substantially comprises a solution of potassium hydroxide. Other aqueous electrolyte systems suitable for use with this invention are nickel-zinc, silver-zinc, mercury-zinc, mercury-cadmium and nickel-cadmium.

EXAMPLE

Thin flat LeClanche cells, as shown in FIG. 2, except that the cathode collector was a solid steel plate, were prepared using a positive electrode mix of manganese dioxide, graphite and acetylene black, a negative zinc sheet electrode, and an electrolyte of ammonium chloride and zinc chloride. A cellulosic separator was disposed between the zinc anode and cathode mix of each cell as shown in FIG. 2 and was saturated with the electrolyte of each cell. A vinyl gas-permeable, electrolyte-impermeable paint, comprising a solution of a copolymer of vinyl chloride and vinyl acetate in an organic solvent containing a plasticizer and an epoxy resin stabilizer, was applied to the outer surface of the zinc anode sheet having openings disposed therein. A similar paint with the addition of acetylene black and graphite was applied to the cathode collector. After the paints dried, the coated anode and the conductively coated steel cathode collector were assembled with the other cell components, in a manner as shown in FIG. 2, and then a hot melt adhesive, obtained commercially as Swift Z-863 from the Swift Company, was deposited in the peripheral recesses formed between the extending anode and the cathode plates to produce a thin rectangular flat cell. Each cell measured 1.75 inches wide and 2.75 inches long with the active cathode mix component of each cell measuring 1.48 inches by 2.25 inches.

Each cell was then tested by being successively discharged across a 0.312 ohm load for 0.1 second, a 0.832 ohm load for 1.5 seconds and then across a 6.250 ohm load for 1.0 second. This cycle of discharge was repeated after a three-second rest period until the closed circuit voltage of the cell reached 1.08 volts. The data obtained from the cells, after being stored at 25°C for 11 weeks, are shown in Table 2.

Table 2

| Cell Impedance ohm at 1-kHz. | Open Circuit Voltage | 1st Cycle Closed Circuit Voltage (volts) | No. of Cycles |
|---|---|---|---|
| 2.3 | 1.62 | 1.42 | 29 |
| 2.5 | 1.64 | 1.43 | 26 |
| 0.6 | 1.62 | 1.39 | 19 |
| 10.1 | 1.63 | 1.44 | 39 |
| 0.6 | 1.61 | 1.44 | 47 |
| 2.9 | 1.66 | 1.45 | 37 |

It is thus shown by the above example that using the teachings of this invention, flat cells can be constructed which can deliver a series of pulses of rather high current in a rapid succession without the need for all the cell components to be completely bonded together.

It is to be understood that other modifications and changes to the preferred embodiments of the invention herein shown and described can also be made without departing from the spirit and scope of the invention.

What is claimed is:

1. A thin, flat cell having a metal anode, a cathode of depolarizer mix, a separator between said anode and said cathode, an electrolyte in contact with said anode and said cathode, and a cathode collector; said anode having a plurality of openings for venting undesirable gases formed within the cell and having on its outer surface a substantially continuous layer of a gas-permeable, electrolyte-impermeable paint; and wherein said cathode, said separator and said electrolyte are within and bounded by a peripheral frame of electrolyte-impermeable sealing material, said frame being marginally adhered to said anode and said cathode collector.

2. The cell of claim 1 wherein the cathode collector has a plurality of openings for venting undesirable gases formed within the cell and has on at least one of its surfaces a substantially continuous layer of a gas-permeable, electrolyte-impermeable conductive paint.

3. The cell of claim 1 wherein the openings in said anode are sized between about 78 square microns and about 65,000 square microns.

4. The cell of claim 3 wherein the openings are sized between about 4,200 square microns and about 25,000 square microns.

5. The cell of claim 1 wherein said anode is zinc, said cathode comprises manganese dioxide, and said electrolyte comprises ammonium chloride.

6. The cell of claim 1 wherein said anode is zinc, said cathode comprises manganese dioxide, and said electrolyte comprises zinc chloride.

7. The cell of claim 2 wherein the openings in said cathode collector are sized between about 78 square microns and about 65,000 square microns, said anode is zinc, said cathode comprises manganese dioxide and said electrolyte comprises ammonium chloride.

8. The cell of claim 2 wherein the openings in said cathode collector are sized between about 78 square microns and about 65,000 square microns, said anode is zinc, said cathode comprises manganese dioxide and said electrolyte comprises zinc chloride.

9. A multicell battery comprising an outer negative electrode, an outer positive electrode; at least one duplex electrode between the outer positive electrode and the outer negative electrode; a separator and an electrolyte between each positive and negative electrode; and a cathode collector secured to the outer side of the positive electrode; said outer negative electrode having a plurality of openings for venting undesirable gases formed within the cell and having on its outer surface a substantially continuous layer of a gas-permeable, electrolyte-impermeable paint; said duplex electrode comprising a positive electrode bonded to a porous negative electrode via a conductive layer, and all of said components of said battery secured together so as to maintain a relatively low electrical resistance contact between said individual cell components.

10. The battery of claim 9 wherein the cathode collector has a plurality of openings for venting undesirable gases formed within the cell and has on at least one surface a substantially continuous layer of a gas-permeable, electrolyte-impermeable conductive paint.

11. The battery of claim 9 wherein the openings in said negative electrode are sized between about 78 square microns and about 65,000 square microns.

12. The battery of claim 11 wherein the openings are sized between about 4,200 square microns and about 25,000 square microns.

13. The battery of claim 9 wherein each anode is zinc, each cathode comprises manganese dioxide, and each electrolyte comprises ammonium chloride.

14. The battery of claim 9 wherein each anode is zinc, each cathode comprises manganese dioxide and each electrolyte comprises zinc chloride.

15. The battery of claim 10 wherein the openings in said cathode collector are sized between about 78 square microns and about 65,000 square microns, each anode is zinc, each cathode comprises manganese dioxide and each electrolyte comprises ammonium chloride.

16. The battery of claim 10 wherein the openings in said cathode collector are sized between about 78 square microns and about 65,000 square microns, each anode is zinc, each cathode comprises manganese dioxide and each electrolyte comprises zinc chloride.

17. A thin, flat cell having a sheet metal anode; a cathode of depolarizer mix; a separator between said anode and said cathode, an electrolyte in contact with said anode and said cathode; and a cathode collector; said anode having a plurality of openings for venting undesirable gases formed within the cell and having on its outer surface a substantially continuous layer of a gas-permeable, electrolyte-impermeable paint, and wherein all of said components of said cell are secured together so as to maintain a relatively low electrical resistance contact between said individual cell components.

18. The cell of claim 17 wherein the cathode collector has a plurality of openings for venting undesirable gases formed within the cell and has on at least one surface a substantially continuous layer of a gas-permeable, electrolyte-impermeable conductive paint.

19. The cell of claim 17 wherein the openings in said anode are sized between about 78 square microns and about 65,000 square microns.

20. The cell of claim 19 wherein the openings are sized between about 4,200 square microns and about 25,000 square microns.

21. The cell of claim 17 wherein said anode is zinc, said cathode comprises manganese dioxide, and said electrolyte comprises ammonium chloride.

22. The cell of claim 17 wherein said anode is zinc, said cathode comprises manganese dioxide, and said electrolyte comprises zinc chloride.

23. The cell of claim 18 wherein the openings in said cathode collector are sized between about 78 square microns and about 65,000 square microns, said anode is zinc, said cathode comprises manganese dioxide and said electrolyte comprises ammonium chloride.

24. The cell of claim 18 wherein the openings in said cathode collector are sized between about 78 square microns and about 65,000 square microns, said anode is zinc, said cathode comprises manganese dioxide and said electrolyte comprises zinc chloride.

* * * * *

Notice of Adverse Decision in Interference

In Interference No. 99,859, involving Patent No. 3,901,732, T. K. Kis and A. Reilly, THIN FLAT CELL CONSTRUCTION HAVING A GAS-PERMEABLE COATED PERFORATED ANODE, final judgment adverse to the patentees was rendered Mar. 4, 1982, as to claims 1, 2, 5, 6, 9, 10, 13, 14, 17, 18, 21 and 22.

[*Official Gazette August 17, 1982.*]